United States Patent
Lee et al.

(10) Patent No.: US 9,294,969 B2
(45) Date of Patent: Mar. 22, 2016

(54) METHOD FOR EFFICIENTLY UPDATING SECONDARY CARRIER INFORMATION IN A BROADBAND WIRELESS ACCESS SYSTEM

(75) Inventors: Eun Jong Lee, Anyang-si (KR); Ki Seon Ryu, Anyang-si (KR); Young Soo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 293 days.

(21) Appl. No.: 13/640,681

(22) PCT Filed: Apr. 12, 2011

(86) PCT No.: PCT/KR2011/002589
§ 371 (c)(1),
(2), (4) Date: Oct. 11, 2012

(87) PCT Pub. No.: WO2011/129598
PCT Pub. Date: Oct. 20, 2011

(65) Prior Publication Data
US 2013/0039344 A1    Feb. 14, 2013

Related U.S. Application Data (60) Provisional application No. 61/323,344, filed on Apr. 12, 2010, provisional application No. 61/333,217, filed on May 10, 2010, provisional application No. 61/393,952, filed on Oct. 18, 2010.

(30) Foreign Application Priority Data

Apr. 6, 2011    (KR) ........................ 10-2011-0031617

(51) Int. Cl.
*H04W 4/00*    (2009.01)
*H04W 36/00*    (2009.01)
(Continued)

(52) U.S. Cl.
CPC ........... *H04W 36/0055* (2013.01); *H04L 5/001* (2013.01); *H04W 36/28* (2013.01)

(58) Field of Classification Search
USPC .................................................. 370/310–350
See application file for complete search history.

(56) References Cited

U.S. PATENT DOCUMENTS

2009/0310563 A1* 12/2009 Chou et al. ..................... 370/331
2010/0272067 A1* 10/2010 Lu et al. ......................... 370/331
2010/0284367 A1* 11/2010 Koo et al. ...................... 370/331

FOREIGN PATENT DOCUMENTS

CN    101222751    7/2008
JP    2011-524133    8/2011
(Continued)

OTHER PUBLICATIONS

Lu, U.S. Appl. No. 61/172,344.*
(Continued)

*Primary Examiner* — Kwang B Yao
*Assistant Examiner* — Juvena Loo
(74) *Attorney, Agent, or Firm* — Lee, Hong, Degerman, Kang & Waimey (57) ABSTRACT

The present invention relates to a method for updating secondary carrier information for preemptively allocating secondary carriers during handover and an apparatus for carrying out the method. A method in which a terminal performs handover in a broadband access system that supports multiple carriers according to one embodiment of the present invention comprises: a step in which a target base station receives, from a serving base station, a first message including carrier allocation information on at least one secondary carrier preemptively allocated to the terminal; a step of performing network reentry with the target base station; and judging whether the multi-carrier configuration of the serving base station and the multi-carrier configuration of the target base station are the same, and, if the configurations are different from each other, transmitting, to the target base station, a second message for requesting multi-carrier capability negotiation.

6 Claims, 6 Drawing Sheets

(51) Int. Cl.
*H04L 5/00* (2006.01)
*H04W 36/28* (2009.01)

(56) References Cited

FOREIGN PATENT DOCUMENTS

| KR | 10-2009-0081080 | | 7/2009 |
|----|-----------------|---|--------|
| KR | 10-2010-0025474 | | 3/2010 |
| KR | 10-2010-0029027 | | 3/2010 |
| WO | WO 2007111415 A1 | * | 10/2007 |
| WO | 2009/149665 | | 12/2009 |
| WO | 2010/024591 | | 3/2010 |

OTHER PUBLICATIONS

The State Intellectual Property Office of the People's Republic of China Application Serial No. 201180027034.4, Office Action dated Sep. 30, 2014, 7 pages.

Jung, et al., "Reply comments on MC DG Handover Section (C802.16m-09/1283)," IEEE 802.16 Broadband Wireless Access Working Group <http://ieee802.org/16>, Jul. 2009, 9 pages.

* cited by examiner

METHOD FOR EFFICIENTLY UPDATING SECONDARY CARRIER INFORMATION IN A BROADBAND WIRELESS ACCESS SYSTEM

CROSS-REFERENCE TO RELATED APPLICATIONS

This application is the National Stage filing under 35 U.S.C. 371 of International Application No. PCT/KR2011/002589, filed on Apr. 12, 2011, which claims the benefit of earlier filing date and right of priority to Korean Patent Application No. 10-2011-0031617, filed on Apr. 6, 2011, and also claims the benefit of U.S. Provisional Aplication Ser. No. 61/323,344, filed on Apr. 12, 2010, U.S. Provisional Application Ser. No. 61/333,217, filed on May 10, 2010, and U.S. Provisional Application Ser. No. 61/393,952, filed on Oct. 18, 2010, the contents of which are all hereby incorporated by reference herein in their entirety.

TECHNICAL FIELD

The present invention relates to a broadband wireless access system, and more particularly, to a method and apparatus for updating secondary carrier information in performing a handover for assigning secondary carriers if a serving base station and a target station differs from each other in multicarrier configuration.

BACKGROUND ART

In the following description, carriers are schematically explained.

First of all, a user is able to provide information to transmit by modulating and manipulating an amplitude, frequency and/or phase of a sinusoidal wave or a periodic pulse wave. In this case, the sinusoidal or periodic pulse wave playing a role in carrying the information is called a carrier.

Carrier modulation schemes may be classified into a single-carrier modulation (SCM) scheme and a multicarrier modulation (MCM) scheme. In particular, the single-carrier modulation (SCM) scheme is a modulation scheme of having all information carried on a single carrier.

According to the multicarrier modulation (MCM) scheme, a whole bandwidth channel of a single carrier is divided into a plurality of subchannels having small bandwidths and a plurality of narrowband subcarriers are transmitted on the subchannels by multiplexing.

In doing so, if the multicarrier modulation (MCM) scheme is used, a plurality of the subchannels may be approximated to a flat channel owing to their small bandwidths. And, a user may be able to compensate for channel distortion using a simple equalizer. Moreover, the multicarrier modulation (MCM) scheme enables fast implementation using Fast Fourier Transform (FFT). In particular, the multicarrier modulation (MCM) scheme is superior to the single-carrier modulation (SCM) scheme in aspect of fast data transmission.

As the performance of a base station and/or a mobile station is being increasingly enhanced, a frequency bandwidth providable or available for the base station and/or the mobile station is extending increasingly. Hence, according to embodiments of the present invention, a multicarrier system supportive of a broadband in a manner of aggregating at least one or more carriers together is disclosed.

In particular, a multicarrier system mentioned in the following description corresponds to a case of aggregating at least one or more carriers to use, which is different from the above-mentioned multicarrier modulation (MCM) scheme of dividing a single carrier to use.

In order to efficiently use multi-band or multicarrier, a scheme for a single medium access control (MAC) entity to manage several carriers (e.g., several frequency carriers (FCs)) has been proposed.

Figure 1:
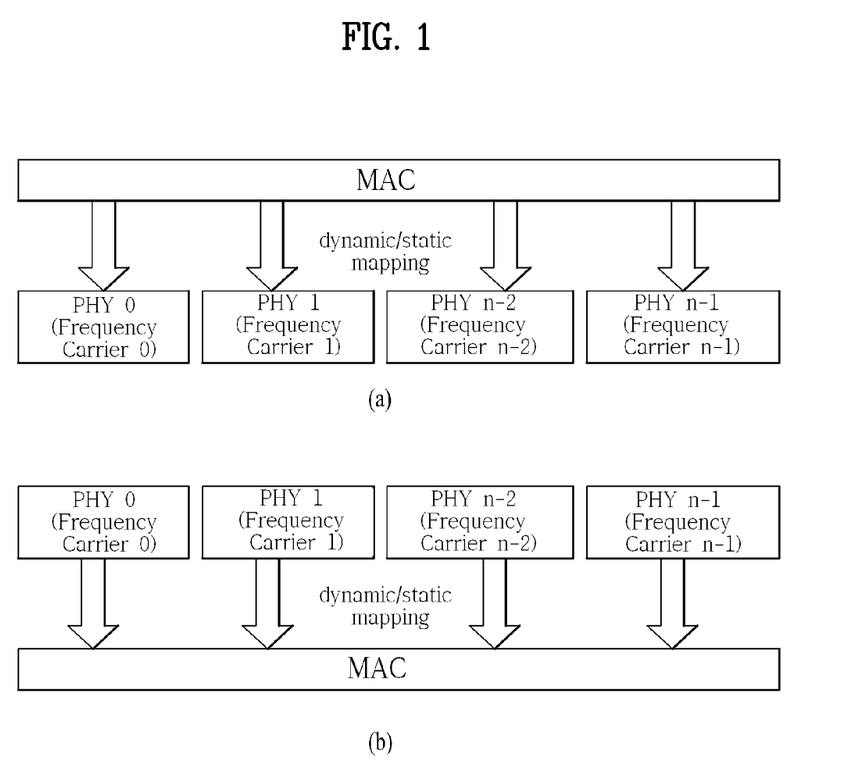

FIG. 1 (a) and FIG. 1 (b) are diagrams to describe a multi-band radio frequency (RF) based signal transceiving method.

Referring to FIG. 1, a medium access control (MAC) layer in a transmitting/receiving side may be able to manage a plurality of carriers to efficiently use multiple carriers. In doing so, in order to effectively transceive multiple carriers, assume that both of the transmitting side and the receiving side are capable of transceiving the multiple carriers. In this case, since it is unnecessary for frequency carriers (FCs) managed by the MAC layer to be contiguous with each other, it is flexible in aspect of resource management. In particular, both contiguous carrier aggregation and non-contiguous carrier aggregation are possible.

Referring to FIG. 1 (a) and FIG. 1 (b), physical layers PHY 0 to PHY n−1 indicate multiple bands of the present invention, respectively. Each of the multiple bands may have a frequency carrier (FC) size assigned to a specific service by a previously determined frequency policy. For instance, PHY 0 (RF carrier 0) may have a size of a frequency band assigned for a normal FM radio broadcast and PHY 1 (RF carrier 1) may have a size of a frequency band assigned for a mobile phone communication.

Thus, the respective frequency bands may differ from each other in frequency band size in accordance with frequency band properties, respectively. For clarity, in the following description, assume that each frequency carrier (FC) has a size of A MHz. And, each of the frequency assignment brands may be represented as a carrier frequency to use a baseband signal on a corresponding frequency band. In the following description, each frequency assignment band shall be named a carrier frequency band. If here is no confusion, each carrier frequency band shall be simply named a carrier. Moreover, as recently defined in 3GPP LTE-A, the above-mentioned carrier may be called a component carrier to be discriminated from a subcarrier used by a multicarrier system.

In this aspect, the multi-band scheme may be called a multicarrier scheme or a carrier aggregation scheme.

Figure 2:
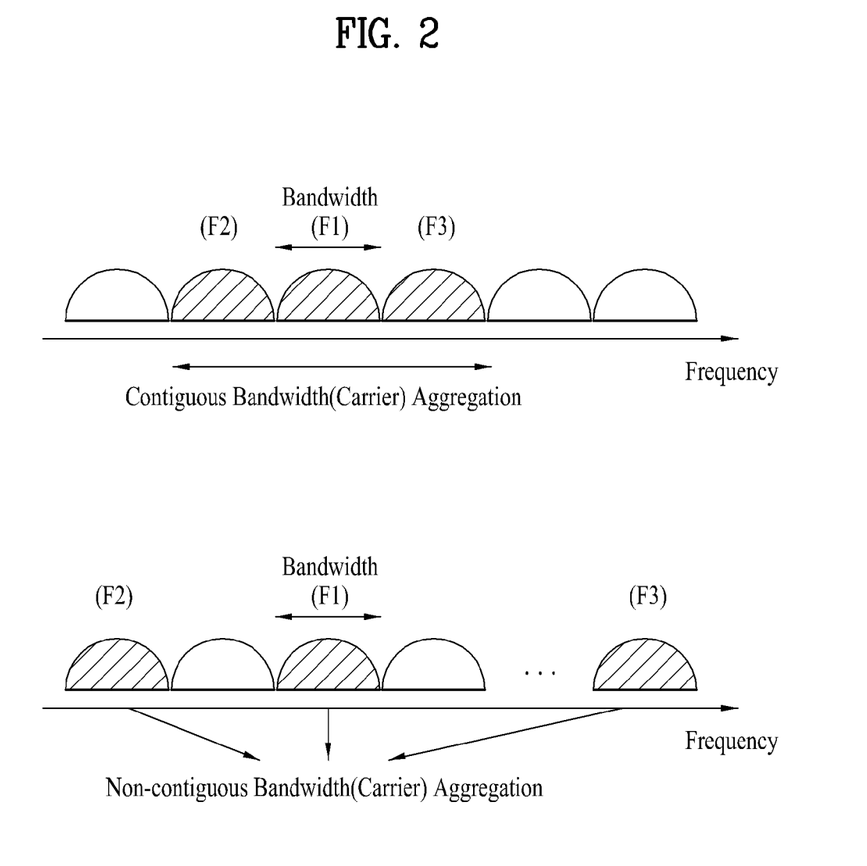
FIG. 2 a diagram for one example of illustrating how multiple carriers are used in a general wireless communication system.

FIG. 2 a diagram for one example of illustrating how multiple carriers are used in a general wireless communication system.

Referring to FIG. 2, a multicarrier in a general technology may include contiguous carrier aggregation [FIG. 2 (a)] or non-contiguous carrier aggregation [FIG. 2 (b)]. In this case, a unit of the carrier aggregation is a basic bandwidth unit of a general legacy system (e.g., LTE in case of LTE-A (long term evolution-advanced) system, IEEE 802.16e in case of IEEE 802.16m system). In a multicarrier configuration of a general technology, carriers of two types are defined as follows.

First of all, a $1^{st}$ carrier (or, a primary carrier) means a carrier means a carrier for exchanging traffics and full PHY/MAC control information between a mobile station and a base station. And, the primary carrier may be usable for such a general operation of a mobile station as a network entry and the like. Moreover, each mobile station has one primary carrier in one cell.

Secondly, a $2^{nd}$ carrier (or, a secondary carrier) generally means a supplementary carrier usable for an exchange of traffics in accordance with a MS-specific assignment command and rule received on the $1^{st}$ carrier. The $2^{nd}$ carrier may include control signaling to support a multicarrier operation. Generally, all control informations and information on a secondary information are received via a primary carrier and data is transmitted and received on the secondary carrier.

General technology may be able to categorize carriers of a multicarrier system into a fully configured carrier and a partially configured carrier based on the above-described primary and secondary carriers.

First of all, the fully configured carrier may indicate the carrier for configuring all control signals including synchronization, broadcast, multicast and unicast control channels. Moreover, informations and parameters for carriers different from those of the multicarrier operation may be included in the control channels.

Secondly, the partially configured carrier may mean the carrier for configuring all control channels to support a DL transmission in a DL carrier having no UL carrier to pair in a TDD (time division duplex) DL transmission or FDD (frequency division duplex) mode. A secondary carrier, which is a fully configured carrier configured in a prescribed mobile station may be allocated as a primary carrier of another mobile station.

Generally, a mobile station performs an initial network entry via a primary carrier and may be able to exchange information on mutual multicarrier capability in a registration procedure via registration request/response (AAI_REG-REQ/RSP) exchange with a base station.

As mentioned in the above description, in a system having multiple carriers supported by both a mobile station and a base station, a handover (HO) can be performed using multiple carriers. In this case, the handover means that a mobile station moves away from a radio interface of one base station into a radio interface of another base station. According to a general handover, a radio interface of one base station is switched to a radio interface of another base station using a single carrier. Yet, according to a handover in multicarrier environment, a radio interface is switched in a manner of preferentially performing a network reentry into a target base station using a primary carrier and then activating a secondary carrier. In doing so, the target base station exchanges information on a mobile station with a serving base station via a backbone network and is also able to transmit information on a secondary carrier to be preassigned to the corresponding mobile station (i.e., secondary carrier pre-assignment). Yet, when the target base station preassigns the secondary carrier to the mobile station, the secondary carrier is assigned with reference to mobile station information retained by the serving base station. However, if the serving base station and the target base station differ from each other in carrier configuration, it may cause a problem that optimal secondary carrier assignment is difficult.

DISCLOSURE OF THE INVENTION

Technical Task

Accordingly, the present invention is directed to substantially obviate one or more problems due to limitations and disadvantages of the related art. First of all, one object of the present invention is to provide a method of efficiently performing a multicarrier operation.

Another object of the present invention is to provide a method for a mobile station to perform a handover in a multicarrier environment in a manner of efficiently updating carrier configuration information of a target base station and having a secondary carrier assigned thereto.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of performing a handover, which is performed by a mobile station in a multicarrier supportive broadband wireless access system, according to one embodiment of the present invention may include the steps of receiving a $1^{st}$ message containing carrier assignment information on at least one secondary carrier preassigned to the mobile station by a target base station from a serving base station, determining whether multicarrier (MC) configurations of the serving base station and the target base station are identical to each other, performing a network reentry into the target base station, and if the multicarrier (MC) configurations of the serving base station and the target base station are not identical to each other, sending a $2^{nd}$ message for requesting a multicarrier capability negotiation to the target base station.

Preferably, the method may further include the step of receiving a neighbor advertisement (AAI-NBR-ADV) message containing system information of a neighbor base station from the serving base station, and the determining step may be performed in a manner of comparing multicarrier configuration information in the target base station system information contained in the neighbor advertisement message to that of the serving base station.

Preferably, the method may further include the step for the serving base station to receive a multicarrier response message containing a carrier list indicating a subset to be assigned as a secondary carrier of the mobile station among available carriers of the target base station from the target base station in response to the $1^{st}$ message.

Preferably, the method may further include the step of sending a handover request message containing information on requesting the at least one secondary carrier to be preassigned to the serving base station.

Preferably, the $1^{st}$ message may include a handover command (AAI-HO-CMD) message and the $2^{nd}$ message may include a multicarrier request (AAI-MC-REQ) message.

To further achieve these and other advantages and in accordance with the purpose of the present invention, a method of supporting a handover, which belongs to a mobile station and supported by a serving base station in a multicarrier supportive broadband wireless access system, according to one embodiment of the present invention may include the steps of transmitting multicarrier capability information of the mobile station and request information for requesting to preassign at least one secondary carrier to the mobile station to a target base station, receiving carrier assignment information on the at least one secondary carrier preassigned to the mobile station by the target base station from the target base station, and sending a handover command (AAI-HO-CMD) message containing the carrier assignment information to the mobile station.

Preferably, the method may further include the step of receiving a handover request (AAI-HO-REQ) message containing an indicator for requesting the at least one secondary carrier to be preassigned to the mobile station from the mobile station.

Preferably, the handover command message may further include a field indicating whether the mobile station shall perform a multicarrier capability negotiation with the target base station.

More preferably, the method may further include the step of determining whether multicarrier configuration information of the target base station is identical to that of the serving base station by comparison. In this case, if the multicarrier configuration information of the target base station is not identical to that of the serving base station, the field is set to a value indicating to perform the multicarrier capability negotiation. On the contrary, if the multicarrier configuration information of the target base station is identical to that of the serving base station, the field is set to a value indicating not to perform the multicarrier capability negotiation.

Preferably, each of the request information transmitting method and the carrier assignment information receiving step may be performed via a backbone network and the handover command message sending step may be performed via a primary carrier.

To further achieve these and other advantages and in accordance with the purpose of the present invention, a mobile station, which operates in a multicarrier supportive broadband wireless access system, according to one embodiment of the present invention may include a processor and a radio communication (RF) module configured to externally transceive radio signals under the control of the controller, wherein if carrier assignment information on at least one secondary carrier preassigned to the mobile station by a target base station is acquired from a $1^{st}$ message received from a serving base station, the processor performs a network reentry into the target base station, wherein the processor determines whether multicarrier (MC) configurations of the serving base station and the target base station are identical to each other, and wherein if the multicarrier (MC) configurations of the serving base station and the target base station are not identical to each other, the processor sends a $2^{nd}$ message for requesting a multicarrier capability negotiation to the target base station.

Preferably, the processor may acquire system information of a neighbor base station from a neighbor advertisement (AAI-NBR-ADV) message received from the serving base station and determine whether the multicarrier (MC) configurations of the serving base station and the target base station are identical to each other in a manner of comparing multicarrier configuration information in the target base station system information contained in the neighbor advertisement message to that of the serving base station.

Preferably, the processor may acquire a list of carriers to be assigned as a secondary carrier of the mobile station among available carriers of the target base station from a multicarrier response message received from the target base station in response to the $2^{nd}$ message.

Preferably, the processor may send a handover request message containing information on requesting the at least one secondary carrier to be preassigned to the serving base station.

Preferably, the $1^{st}$ message may include a handover command (AAI-HO-CMD) message and the $2^{nd}$ message may include a multicarrier request (AAI-MC-REQ) message.

Advantageous Effects

Accordingly, the present invention may provide the following effects and/or features.

First of all, using embodiments of the present invention, a multicarrier operation can be more efficiently performed between a mobile station and a base station.

Secondly, according to the embodiments of the present invention, if a target base station differs from a serving base station in carrier configuration, a carrier management can be more efficiently performed in a manner that a mobile station updates multicarrier configuration with the target base station.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 1 (a) and FIG. 1 (b) are diagrams to describe a multi-band radio frequency (RF) based signal transceiving method.

MODE FOR INVENTION

The present invention relates to a wireless access system. In the following description, methods of updating multicarrier information efficiently in a handover procedure for preassigning a secondary carrier of a target base station to a mobile station according to embodiments of the present invention are described.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of drawings, procedures or steps, which may ruin the substance of the present invention, are not explained. And, procedures or steps, which can be understood by those skilled in the art, are not explained as well.

In this specification, embodiments of the present invention are described centering on the data transmission/reception relations between a base station and a mobile station. In this case, the base station is meaningful as a terminal node of a network which directly performs communication with the mobile station. In this disclosure, a specific operation explained as performed by a base station can be occasionally performed by an upper node of the base station.

In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an advanced base station (ABS), an access point, an advanced base station (ABS) and the like. And, 'mobile station (MS)' can be replaced by such a terminology as a user equipment (UE), a subscriber station (SS), a mobile subscriber station (MSS), an advanced mobile station (AMS), a mobile terminal and the like.

Moreover, a transmitting side means a node that transmits a data service or a speech service. And, a receiving side means a node that receives a data service or a speech service. Hence, a mobile station can become a transmitting side and a base station can become a receiving side, in uplink. Likewise, a mobile station becomes a receiving side and a base station becomes a transmitting side, in downlink.

Meanwhile, a mobile station of the present invention may include one of a PDA (personal digital assistant (PDA), a cellular phone, a PCS (personal communication service) phone, a GSM (global system for mobile) phone, a WCDMA (wideband CDMA) phone, an MBS (mobile broadband system) phone and the like.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. In particular, embodiments of the present invention may be supported by at least one of P802.16-2004, P802.16e-2005, P802.16Rev2 and P802.16m documents which are the standards of IEEE 802.16 system.

In the following description, specific terminologies used for embodiments of the present invention are provided to help the understanding of the present invention. And, the use of the specific terminology can be modified into another form within the scope of the technical idea of the present invention.

The present specification is described on the assumption of IEEE 802.16 system. In particular, a mobile station mentioned in the following description may be assumed as an AMS (advanced mobile station) that satisfies the standards defined by IEEE 802.16m. And, a base station is assumed as an ABS (advanced base station) that satisfies the same standards.

Terminologies usable for a multicarrier operation are defined as follows.

1. Available carriers mean all carriers belonging to a base station (e.g., ABS). A mobile station may be able to obtain information on the available carrier via a global carrier configuration (AAI_Global-config) message or a multicarrier advertisement (AAI_MC-ADV) message.

2. Assigned carriers mean a subset of available carriers assigned to a mobile station by a base station in accordance with capability of the mobile station. In particular, in consideration of the capability of the mobile station, the base station may be able to assign at least one of its available carriers as an assigned secondary carrier of the mobile station.

3. Active carrier means a carrier ready to actually exchange data between a mobile station and a base station and may include a subset of assigned carriers. Activation or deactivation of the assigned secondary carrier may be determined by a determination of the base station based on a QoS (quality of service) request. The base station may be able to inform the mobile station of a presence or non-presence of activation/deactivation of a specific secondary carrier via a carrier management command (AAI_CM-CMD) message.

Based on the above-mentioned definitions, a process for a base station to assign a carrier to a mobile station from a network entry procedure and a handover procedure for pre-assigning a secondary carrier of a target base station to a mobile station in a multicarrier environment are described with reference to FIG. 3 and FIG. 4, respectively, as follows.

Figure 3:
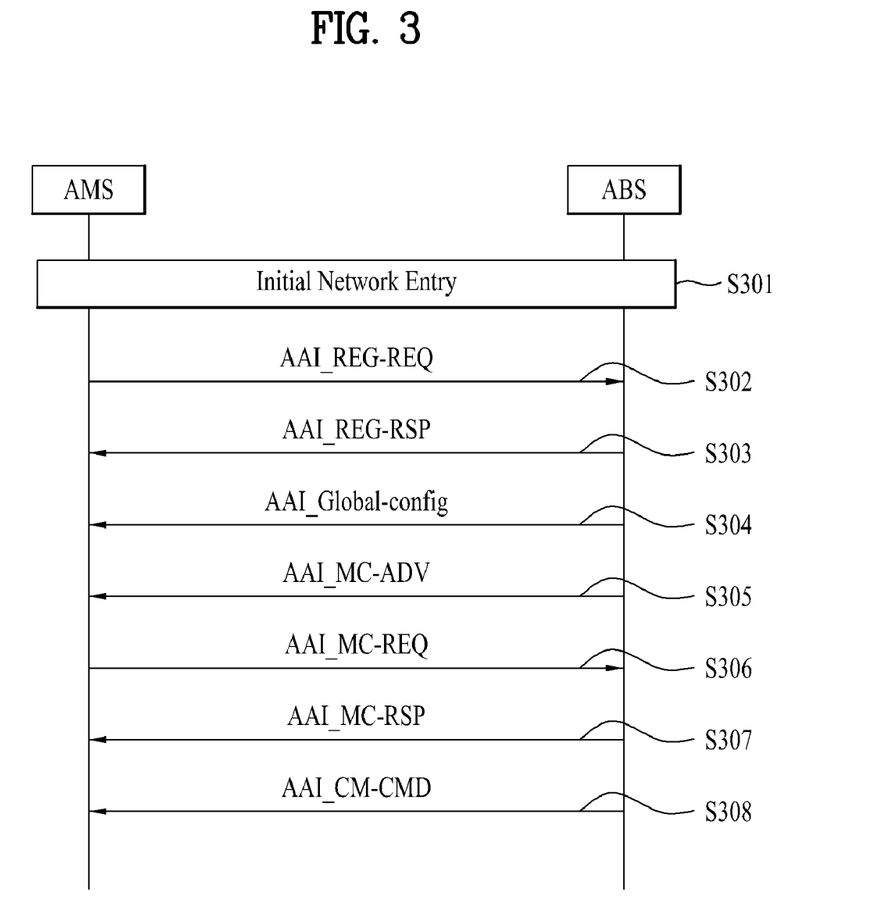
FIG. 3 is a diagram for one example of a procedure for a base station to assign at least one carrier to a mobile station in a broadband wireless access system.

FIG. 3 is a diagram for one example of a procedure for a base station to assign at least one carrier to a mobile station in a broadband wireless access system.

Referring to FIG. 3, an advanced mobile station (AMS) performs an initial access procedure (e.g., an initial network entry) including a scanning step, a ranging step and the like on a base station (ABS) [S301].

The mobile station and the base station may be able to exchange information on mutual multicarrier capabilities via registration request/response (AAI_REG-REQ/RSP) messages [S302, S303].

Having sent the AAI-REG-RSP message to the mobile station, the base station may be able to send a global carrier configuration (AAI_Global-CFG) message [S304].

In this case, the global carrier configuration message may contain information on all available carriers supported by a network.

The mobile station receives a multicarrier advertisement (AAI_MC-ADV) message periodically broadcasted by the base station and may be then able to obtain the information on a multicarrier configuration of the base station [S305].

Subsequently, using the obtained information, the mobile station may be able to make a request for a list of assigned carrier to the base station in a manner of informing the base station of information on carriers (i.e., AMS's supportable carriers) supportable by the mobile station in accordance with the multicarrier configurations of the available carriers of the base station via a multicarrier request (AAI_MC-REQ) message [S306].

Based on the information received from the mobile station, the base station determines an assigned carrier list by determining a subset to assign secondary carriers of the mobile station in its available carriers and may be then able to inform the mobile station of the determined assigned carrier list via a multicarrier response (AAI_MC-RSP) message [S307].

Thereafter, the base station may be able to inform the mobile station of a presence or non-presence of activation/deactivation of the assigned carrier having been assigned to the mobile station in accordance with the determination on the basis of a QoS (quality of service) request in a manner of sending a carrier management command (AAI_CM-CMD) message to the mobile station [S308].

Figure 4:
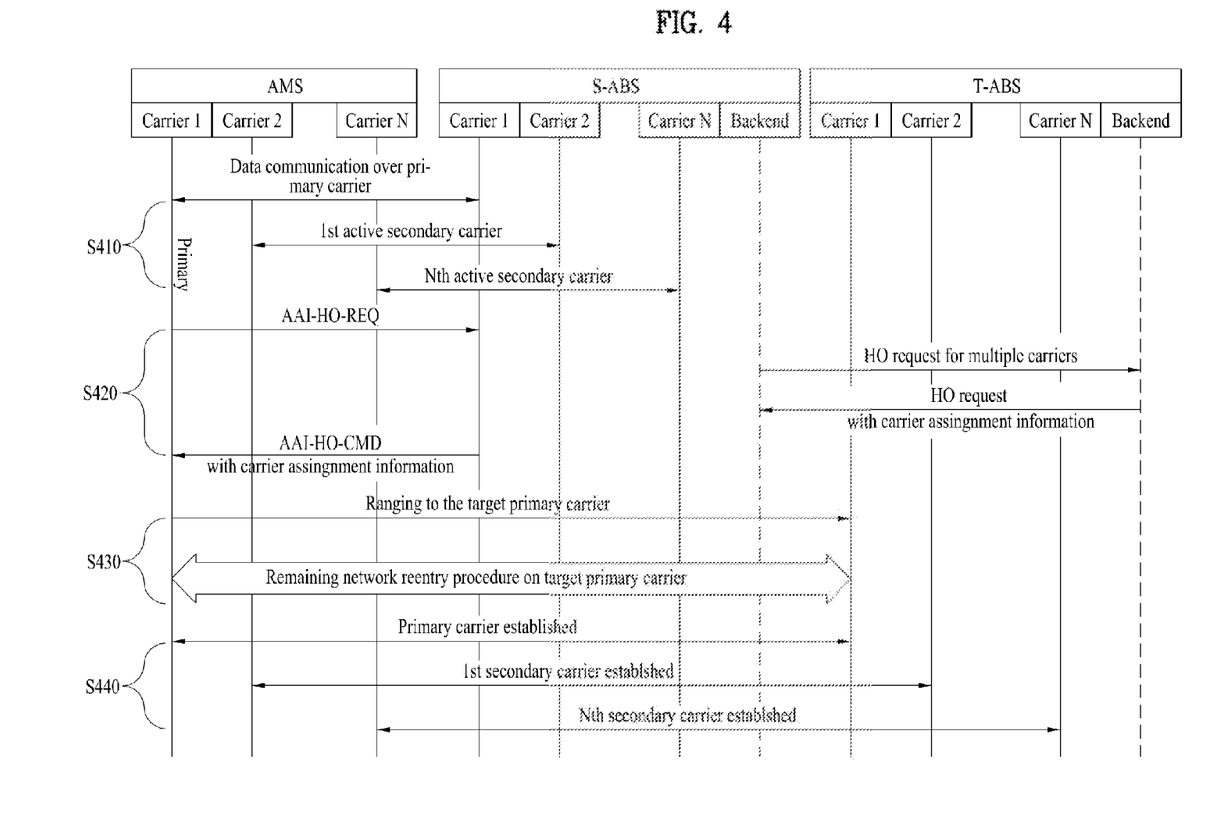
FIG. 4 is a diagram for one example of a handover procedure for preassigning a secondary carrier to a mobile station in a multicarrier environment according to the present invention.

FIG. 4 is a diagram for one example of a handover procedure for preassigning a secondary carrier to a mobile station in a multicarrier environment according to the present invention.

Referring to FIG. 4, first of all, assume that a carrier 1 of a mobile station is a primary carrier, that a carrier 1 of each base station is a primary carrier, and that the rest of carriers except a carrier 1 are secondary carriers.

A mobile station performs an initial network entry or a network reentry into a serving base station via a primary carrier (i.e., carrier 1), activates at least one secondary carrier by the procedure described with reference to FIG. 3, and is then able to perform a data exchange using the activated at least one secondary carrier [S410].

Subsequently, if a prescribed handover trigger condition is met, the mobile station may be able to send a handover request (AAI-HO-REQ) message to the serving base station. In doing so the mobile station may be able to make a request for assigning a secondary carrier to a target base station in a manner that a carrier preassignment indication field is contained in the handover request message. Hence, the serving base station announces multicarrier (MC) capability of the mobile station and information indicating that the mobile station has requested the secondary carrier preassignment via a backbone (or backhaul) network. The target base station determines a secondary carrier to preassign in consideration of the multicarrier capability of the mobile station and then carrier assignment information on the determined secondary carrier to the serving base station. Subsequently, the serving base station transmits the secondary carrier preassignment information received from the target base station to the mobile station in a manner that the corresponding secondary carrier preassignment information is contained in a handover command (AAI-HO-CMD) message [S420].

The secondary carrier, which is preassigned to the corresponding mobile station in the handover command message, may be indicated to the mobile station via a physical carrier index of the secondary carrier index.

Thereafter, the mobile station attempts a ranging to the target base station through the primary carrier. If the ranging is successful, the mobile station performs the rest of the network reentry procedure to complete the network reentry [S430].

Once the network reentry via the primary carrier is completed, the mobile station is able to attempt activation of the preassigned secondary carrier [S440]. In particular, the mobile station activates the secondary carrier, for which a carrier status indication field of the handover command message is set, among the preassigned secondary carriers right after the handover has been completed.

As mentioned in the above description of the procedure, if the secondary carrier of the target base station is preassigned to the mobile station, a negotiation of the multicarrier capability of the mobile station is not performed between the target base station and the mobile station in general. This is because the target base station acquires the multicarrier capability information of the mobile station from the serving base station via the backbone network. Yet, since the mobile station multicarrier (MC) capability information determined by the serving base station to the target base station is the information prepared on the basis of the multicarrier configuration of the serving base station, if the multicarrier configuration of the target base station is different from that of the serving base station, it may be difficult to assign an optimal secondary carrier.

Therefore, the present invention proposes that the serving base station instructs the mobile station to perform the multicarrier capability negotiation with the target base station. Alternatively, the present invention proposes that the mobile station compares the multicarrier configuration of the serving base station and the multicarrier configuration of the target base station with each other. If the multicarrier configurations are different from each other, the present invention proposes the mobile station to perform the multicarrier capability negotiation.

Multicarrier Capability Negotiation According to Determination Made by Mobile Station According to one embodiment of the present invention, in case that a mobile station recognizes that a target base station and a serving base station differ from each other in multicarrier configuration, the mobile station preferentially performs a handover and then performs a negotiation of multicarrier capability with the target base station. In doing so, the mobile station may be able to use a neighbor advertisement (AAI-NBR-ADV) message to determine whether the target base station and the serving base station differ from each other in multicarrier configuration. In particular, since system information on a neighbor base station is contained in the neighbor advertisement message, the mobile station is able to use the system information to determine whether the target base station and the serving base station differ from each other in multicarrier configuration. In the following description, a multicarrier handover procedure and a multicarrier capability negotiation procedure subsequent to the multicarrier handover procedure according to one embodiment of the present invention are explained with reference to FIG. 5.

Figure 5:
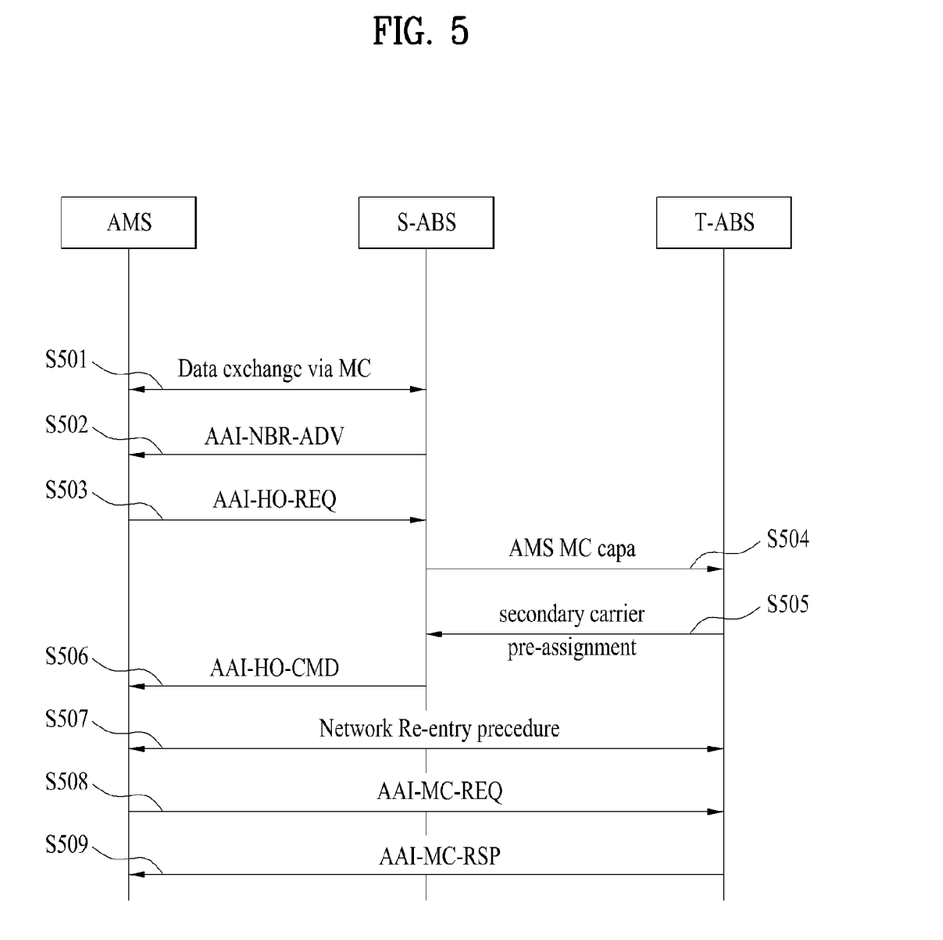
FIG. 5 is a diagram for one example of a handover procedure in a multicarrier embodiment according to one embodiment of the present invention.

FIG. 5 is a diagram for one example of a handover procedure in a multicarrier embodiment according to one embodiment of the present invention. Although a primary carrier is shown in FIG. 5, assume an environment in which both an activation of a secondary carrier and a data exchange via the activated secondary carrier can be performed.

Referring to FIG. 5, in a multicarrier environment, a mobile station may be able to perform a data exchange with a serving base station through at least one carrier [S501].

Moreover, the mobile station receives a neighbor advertisement (AAI-NBR-ADV) message transmitted by prescribed periods from the serving base station and may be then able to acquire system information of neighbor base stations [S502].

Subsequently, if a prescribed handover trigger condition is met, the mobile station may be able to transmit a handover request message to the base station [S503]. In doing so, a carrier preassignment indication field is set in the handover request message.

Having received the handover request message, the serving base station announces multicarrier (MC) capability of the mobile station and information indicating that the mobile station has requested multicarrier preassignment, via a backend, backbone or backhaul network [S504].

The target base station determines a secondary carrier to preassign in consideration of the multicarrier capability of the mobile station and then transmits information on the determined secondary carrier (i.e., carrier assignment information) to the serving base station [S505].

The serving base station transmits the secondary carrier preassignment information received from the target base station to the mobile station in a manner of transmitting a handover command (AAI-HO-CMD) message that contains the secondary carrier preassignment information [S506].

The mobile station attempts a ranging to the target base station through a primary carrier. If the ranging is successfully completed, the mobile station completes a network reentry by performing the rest of a network reentry procedure [S507].

Thereafter, if the mobile station determines that the target base station and the serving base station differ from each other in multicarrier configuration using the target base station system information acquired from the neighbor advertisement message, the mobile station may be able to newly perform a multicarrier capability negotiation by exchanging multicarrier request message and multicarrier response message with the target base station [S508, S509]. In particular, the mobile station may be able to make a request for changing an assigned carrier to the target base station by transmitting a multicarrier request (AAI-MC-REQ) message.

Of course, the mobile station finishes the network reentry into the target base station and may be then able to directly activate a preassigned secondary carrier by transmitting a carrier management indication (AAI-CM-IND) message to the target base station. For instance, if the carrier management indication message is not received from the mobile station until a specific point (e.g., activation deadline), the mobile station may be able to indicate activation of another secondary carrier by transmitting a carrier management command (AAI-CM-CMD) message.

FIG. 5 shows that the neighbor advertisement message is received by the mobile station before the handover request message is transmitted, by which the present invention may be non-limited. For instance, the neighbor advertisement message can be received at any time before the mobile station cancels the connection with the serving base station.

Meanwhile, the mobile station may be able to determine whether the multicarrier configuration information is different in a manner of comparing the AAI-MC-ADV message of the target base station with the previously received AAI-MC-ADV message of the serving base station. In particular, the AAI-MC-ADV message may be received after the mobile station has found the target base station by a scanning or the like in the course of the ongoing handover or after completion of the handover into the target base station.

Multicarrier Capability Negotiation According to Determination Made by Serving Base Station According to another embodiment of the present invention, if a serving base station receives secondary carrier information on a secondary carrier preassigned to a mobile station from a target base station, the serving base station determines whether its multicarrier configuration is identical to that of the target base station. If the multicarrier configuration of the serving base station is different from that of the target base station, the serving base station is proposed to instruct the mobile station to perform a multicarrier capability negotiation with the target base station.

To this end, the base station may enable information, which instructs the mobile station to perform the multicarrier capability negotiation with the target base station, to be contained in a handover command message. For clarity, such information shall be named a multicarrier request/response message exchange indicator (AAI-MC-REQ/RSP exchange indicator) in this specification.

One example of multicarrier request/response message exchange indicator information contained as a field in a handover command message is shown in Table 1.

TABLE 1

| Name | Value | Usage |
|---|---|---|
| Previous fields omitted | ... | ... |
| AAI_MC-REQ/RSP exchange indicator | This field indicates whether to perform a multicarrier request/response message exchange with a target base station after handover.<br>0: Advanced Mobile station (AMS) shall use the secondary carriers assigned or preassigned from a serving base station (ABS) after handover (HO).<br>1: Advanced Mobile station (AMS) shall transmit AAI_MC-REQ message after HO. This can lead to update the assigned secondary carrier(s). | |
| Next fields omitted | ... | ... |

Referring to Table 1, if a multicarrier request/response message exchange indicator field is set to 0, it may be able to instruct a mobile station to exactly perform activation of secondary carrier(s) according to preassigned secondary carrier information. On the contrary, if the corresponding field is set to 1, it may be able to instruct a mobile station to perform a multicarrier capability negotiation by sending a multicarrier request message to a target base station after completion of handover.

As mentioned in the above description, the rest of the multicarrier handover procedure except the handover command message containing the multicarrier request/response message exchange indicator field and whether to perform the multicarrier capability negotiation according to the field value may follow the former procedure described with reference to FIG. 4 and its redundant details shall be omitted from the following description for clarity.

Through the above-described methods, a mobile station and a base station may be able to perform a multicarrier operation by assigning and activating secondary carrier(s) more efficiently.

Structures of Mobile Station and Base Stations

In the following description, a mobile station and base stations (FBS, MBS), to which the above-described embodiments of the present invention are applicable, according to another embodiment of the present invention are explained.

First of all, a mobile station works as a transmitter in uplink and is able to work as a receiver in downlink. A base station works as a receiver in uplink and is able to work as a transmitter in downlink. In particular, each of the mobile station and the base station includes a transmitter and a receiver for transmission of information and/or data.

Each of the transmitter and the receiver can include a processor, a module, a part and/pr a means for performing embodiments of the present invention. In particular, each of the transmitter and the receiver can include a module (means) for encrypting a message, a module for interpreting the encrypted message, an antenna for transceiving the message and the like. Examples of the transmitting and receiving sides are described with reference to FIG. 6 as follows.

Figure 6:
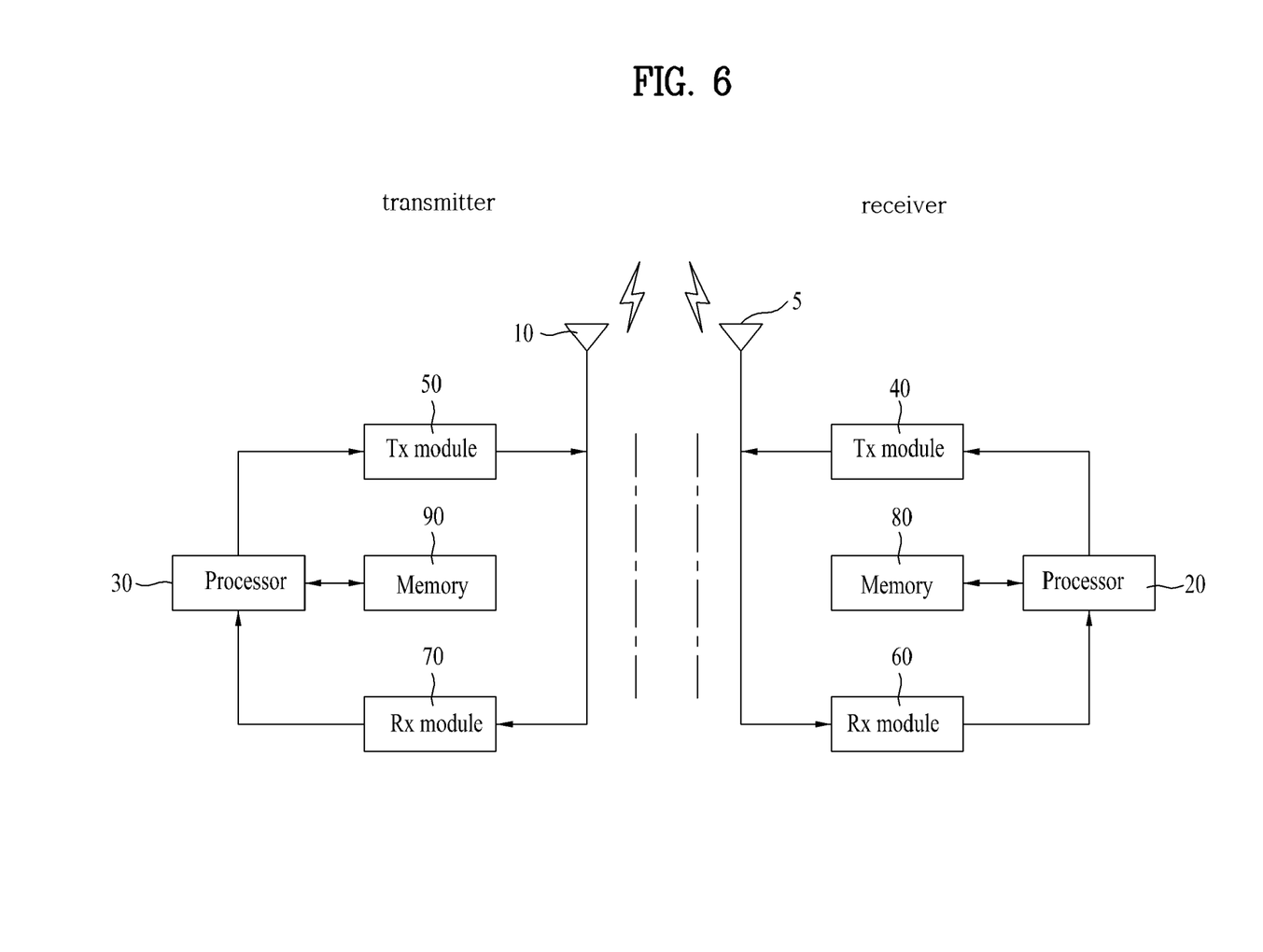
FIG. 6 is a block diagram for one example of structures of transmitting and receiving sides according to another embodiment of the present invention.

FIG. 6 is a block diagram for one example of structures of transmitting and receiving sides according to another embodiment of the present invention.

Referring to FIG. 6, a left part of the drawing shows a structure of a transmitting side and a right part of the drawing shows a structure of a receiving side. The transmitting/receiving side may include an antenna 5/10, a processor 20/30, a transmitting (Tx) module 40/50, a receiving (Rx) module 60/70 and a memory 80/90. And, the respective components may be able to perform functions corresponding to each other. The respective components are described in detail as follows.

The antenna 5/10 performs a function of externally transmitting a signal generated from the transmitting module 40/50 or a function of receiving a radio signal from outside and then delivering the received radio signal to the receiving module 60/70. In case that a multiple-antenna (MIMO) function is supported, at least two antennas can be provided to the mobile station or the base station.

The antenna, the transmitting module and the receiving module may be integrated into a radio frequency (RF) module.

The processor 20/30 generally controls overall operations of a mobile/base station. In particular, the processor 20/30 is able to perform a control function for performing the above-described embodiments of the present invention, a MAC (medium access control) frame variable control function according to service characteristics and propagation environment, a handover function, an authentication function, an encryption function and the like. In more particular, the processor 20/30 can perform overall controls for the carrier configuration information acquisition/update/handover procedures shown in FIGS. 3 to 5.

Especially, the processor of the mobile station may be able to request a secondary carrier preassignment of a target base station via a handover request message in a multicarrier environment. If information on preassigned secondary carrier is contained in a handover command message, the processor completes a network reentry into the target base station and may be then able to activate the corresponding secondary carrier. Yet, in case of determining that multicarrier configuration of the target base station is different from that of a serving base station using a neighbor advertisement message received from the serving base station, the processor may be able to perform a multicarrier capability negotiation by sending a multicarrier request message after completion of the network reentry into the target base station.

Besides, the processor of the mobile station may be able to perform overall control operations of the operating process disclosed in the above-mentioned embodiments.

The transmitting module 40/50 performs prescribed coding and modulation on a data, which is scheduled by the processor and will be then transmitted externally, and is then able to deliver the coded and modulated data to the antenna 50/10.

The receiving module 60/70 reconstructs the radio signal received externally via the antenna 1000/1010 into original data in a manner of performing decoding and demodulation on the radio signal received via the antenna 5/10 and is then able to deliver the reconstructed original data to the processor 20/30.

The memory 80/90 can store programs for processing and control of the processor 20/30 and is able to perform a function of temporarily storing input/output data. And, the memory 80/90 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

Meanwhile, the base station may perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function, and the like using at least one of the modules mentioned in the foregoing description and may further include means, modules, parts and/or the like to perform these functions.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

Industrial Applicability

Accordingly, a more efficient multicarrier handover performing procedure in a broadband wireless access system and a mobile station structure for the same are mainly described by taking one example applied to IEEE 802.16m system and may be further applicable to various kinds of mobile communication systems including 3GPP/3GPP2 and the like as well as IEEE 802.xx system.

What is claimed is:

1. A method of performing a handover by a mobile station in a multicarrier supportive wireless access system, the method comprising:
    receiving a handover command message containing carrier assignment information on at least one secondary carrier preassigned to the mobile station by a target base station from a serving base station,
    wherein the handover command message further comprises a field indicating whether the mobile station shall perform a multicarrier capability negotiation with the target base station;
    determining whether multicarrier (MC) configurations of the serving base station and the target base station are identical to each other;
    performing a network reentry into the target base station; and
    if the multicarrier (MC) configurations of the serving base station and the target base station are not identical to each other, sending a message for requesting a multicarrier capability negotiation to the target base station.

2. The method of claim 1, further comprising:
    transmitting a handover request to the serving base station, the handover request message including an indicator that requests an assignment of a target secondary carrier.

3. The method of claim 1, wherein the message comprises a multicarrier request message.

4. A mobile station, which operates in a multicarrier supportive wireless access system, the mobile station comprising:

a radio frequency (RF) communication module configured to receive, from the serving base station, a handover command message containing carrier assignment information on at least one secondary carrier preassigned to the mobile station by a target base station, wherein the handover command message further comprises a field indicating whether the mobile station shall perform a multicarrier capability negotiation with the target base station; and a processor configured to
- determine whether multicarrier (MC) configurations of the serving base station and the target base station are identical to each other; and
- if the multicarrier (MC) configurations of the serving base station and the target base station are not identical to each other, send a message for requesting a multicarrier capability negotiation to the target base station.

5. The mobile station of claim 4, wherein the RF communication module is configured to transmit a handover request to the serving base station, the handover request message including an indicator that requests an assignment of a target secondary carrier.

6. The mobile station of claim 4, wherein the message comprises a multicarrier request message.

* * * * *